United States Patent
Bertuccioli et al.

(10) Patent No.: US 7,799,359 B2
(45) Date of Patent: Sep. 21, 2010

(54) PROCESS FOR WINE ELECTROCHEMICAL EVOLUTION OF WINE UNDER CONTROLLED POTENTIAL AND RELEVANT REACTOR

(75) Inventors: Mario Bertuccioli, Florence (IT); Gian Nicola Martelli, Milan (IT); Luciano Iacopetti, Milan (IT); Dario Oldani, Milan (IT); Salvatore Peragine, Milan (IT); Cleto Simoncelli, Grottaferrata (IT)

(73) Assignee: Industrie de Nora S.p.A., Milan (IT)

( * ) Notice: Subject to any disclaimer, the term of this patent is extended or adjusted under 35 U.S.C. 154(b) by 801 days.

(21) Appl. No.: 11/726,930

(22) Filed: Mar. 23, 2007

(65) Prior Publication Data
US 2008/0233249 A1  Sep. 25, 2008

(30) Foreign Application Priority Data
Mar. 24, 2006 (IT) ............... MI06A0547

(51) Int. Cl.
*A21D 6/00* (2006.01)

(52) U.S. Cl. .................. 426/244; 426/592; 99/451
(58) Field of Classification Search .............. 426/239, 426/244, 237, 15, 592; 99/485, 358, 378, 99/451
See application file for complete search history.

(56) References Cited

U.S. PATENT DOCUMENTS

| 5,503,663 A * | 4/1996 | Tsou ................. 106/1.24 |
| 2004/0137109 A1 * | 7/2004 | Guglielmi et al. ......... 426/11 |

OTHER PUBLICATIONS

Redox potential of wines from a Croatian market NPL, 1991.*

* cited by examiner

*Primary Examiner*—Drew E Becker
*Assistant Examiner*—Preston Smith
(74) *Attorney, Agent, or Firm*—Charles A. Muserlian

(57) ABSTRACT

The invention relates to a process for wine evolution by electrochemical way, with reduced treatment times and controlled selectivity. The process may be carried out at the anodic compartment of an electrochemical reactor subdivided by a semipermeable membrane on a valve metal anode, for instance a titanium anode, provided with catalytic coating containing platinum or other noble metal.

8 Claims, 5 Drawing Sheets

PROCESS FOR WINE ELECTROCHEMICAL EVOLUTION OF WINE UNDER CONTROLLED POTENTIAL AND RELEVANT REACTOR

BACKGROUND OF THE INVENTION

The present invention relates to a process for controlled evolution of wine by electrochemical way and to the relevant electrochemical reactor.

The evolution of wines is a series of processes taking place after the phases of alcoholic fermentation of must and subsequent malolactic fermentation; such processes can be generally subdivided into a maturation step, consisting of a series of oxidative processes in the presence of small quantities of oxygen, and an optional aging step, in the absence of oxygen. The evolution of a wine starting from the termination of the fermentation steps up to the commercialisation normally requires pretty long times especially for high quality wines, involving rather high costs. The maturation step, in particular, is extremely critical as known to those skilled in the art, since excessive amounts of oxygen would cause the undesirable process of acetic fermentation, with irreparable deterioration of the product; in order to supply a controlled amount of oxygen, the maturation is traditionally carried out with wooden casks, known in the art as barriques, favouring the micro-oxygenation of wine through natural permeation across the porosity of their walls. The high price of the barriques and the lengthy treatment times nevertheless negatively affect the product cost. A commonly practised alternative consists of maturing wine in metal tubs, in which a controlled amount of air is bubbled; also this solution is however expensive, not very efficient (especially due to the insufficient homogeneity in the distribution of air within the bulk of treated wine) and generally unsuitable to sensibly reduce the treatment times.

More recently, wine micro-oxygenation processes by electrochemical way have been proposed, for instance according to the disclosure of US 2004/0137109: the controlled evolution of small amounts of oxygen on the surface of high surface area titanium anodes immersed in the wine to be treated, at current densities typically comprised between 1 and 500 $\mu A/cm^2$, favours the accelerated evolution thereof.

However the improved process of US 2004/0137109 still has some inconveniences: the passage of anodic micro-currents through titanium anodes in fact takes place at very high potentials, largely above 1 V (vs. Ag/AgCl), whereat oxygen evolution is an inevitable process. Although such process allows remarkable savings on the treatment time for maturation, it has for instance no effect on the characteristics deriving from the aging of wine, that is on the process phase traditionally occurring after the bottling, rigorously in the absence of oxygen, which requires prolonged times with the associated capital and storage costs.

Furthermore, the result obtained in terms of organoleptic properties, although not negligible, is still distant from what obtainable with the traditional manufacturing, for instance by maturation in barrique, because the chemistry associated with these processes is very complex and involves reactions preferentially taking place at potentials below the one of oxygen discharge on titanium; this applies in particular to the polymerisation and stabilisation reactions of some compounds with colouring properties. The wine obtained immediately after the fermentation steps is rich in phenolic compounds, the most important of which belong to the families of flavonoids and anthocyans. The latter in particular, together with the anthocyanidins which are a common derivative thereof, are responsible of the purple colour of new wines and tend to undergo structural transformations during the maturation and aging steps, for example by association with other phenolic compounds such as flavanols giving colourless compounds, or aggregating in polymers which tend to precipitate due to their poor solubility, bestowing wine with progressively lighter colours tending to orange or brick. As it can be experimentally noticed both by chromatographic analysis and by organoleptic determination, the equilibrium of these complex reactions is not exactly respected by the known electrochemical treatments carried out with micro-currents at oxygen discharge potential.

OBJECTS OF THE INVENTION

It is one object of the present invention to provide an electrochemical process of wine evolution overcoming the limitations of the prior art, in particular allowing a substantial reduction of the treatment times while preserving the essential organoleptic characteristics of a naturally aged wine.

It is a further object of the present invention to provide a reactor for the electrochemical evolution of wine suitable for carrying out the process of the invention.

These and other objects will be made clear by the following description, which is not intended to limit the domain of the invention whose extent is defined by the attached claims.

DESCRIPTION OF THE INVENTION

The objects of the present invention are accomplished through the electrochemical procedure and the relevant reactor as detailed in the appended claims.

The inventors have surprisingly observed that wine electrochemical evolution carried out by application of micro-currents on anodes consisting of a valve-metal substrate, preferably titanium, catalytically activated with a coating of noble metals, optionally in form of oxides, allows more faithfully reproducing the wine evolution processes, accelerating the maturation step and providing a final product equivalent to the one subjected to the slow maturation according to the methods of the prior art; the wine matured by the method of the invention moreover presents the surprising characteristic of accomplishing the subsequent aging step in bottle in a sensibly quicker way, contributing also under this aspect to the favourable economics of the process.

The process of the invention provides feeding the wine to be treated to the anodic compartment of an electrochemical cell of the type subdivided by a semipermeable separator, in whose cathodic compartment a sacrificial wine is preferably fed, and applying electric micro-currents, for instance direct currents of density comprised between 0.1 and 50 $\mu A/cm^2$, by means of a titanium or other valve metal anode catalytically activated with noble metals, for instance platinum, iridium or ruthenium, or oxides thereof.

The importance of the anodic catalytic activation, which constitutes an essential feature of the invention, is that it allows operating in a wider range of potential, contrarily to the uncoated titanium electrodes of the prior art which immediately assume very high anodic potentials, higher than that of oxygen discharge, even at extremely reduced currents. In particular, the anode catalysts based on metal oxides are capable of operating at an extremely controlled potential; the inventors observed the best results in terms of quality when the controlled evolution process of the invention is carried out at least partially at a potential lower than 1 V vs. Ag/AgCl, capable of accelerating the aggregation and polymerisation reactions of the phenolic compounds but certainly not capable of causing oxygen evolution. The effectiveness of the catalytic evolution is also expressed in the capability of accelerating this process step as more as possible: the higher the efficiency of the anode catalyst, the more it will be possible to increase the current density staying below the indicated potential threshold, thereby completing the useful treatment in a reduced time. In one embodiment of the invention, the process is carried out in a first step at an anodic potential controlled below 1 V vs. Ag/AgCl as described, optionally monitoring the trend thereof by means of a redox potential control, and in a later step at potential higher than the oxygen discharge, similarly to what happens in the process of the prior art. The inventors observed in particular that the wine electrochemical evolution carried out exclusively at a potential below 1 V vs. Ag/AgCl provides a product whose sensory analysis evidences fresh and fruity components impossible to obtain by means of the electrochemical treatments of the prior art, while in case the evolution is prosecuted at potential above the oxygen discharge, the sensory analysis evidences cooked fruit and marmalade components typical of aged and oxidised wines, only partially obtainable by means of the electrochemical treatments of the prior art.

In certain cases, some components of the wines tend to foul the anode surface, reversibly deactivating their catalytic activity through an adsorption process which may assume the extent of a real filming: in such cases, there is the risk that the anodic potential may go out of control, and that the anode behave almost as an uncatalysed anode. To prevent this phenomenon, it is preferable to apply the micro-currents of the process of the invention in a variously pulsed fashion. By pulsed current application it is intended for example the controlled periodic interruption of current supply in very quick cycles, or even the polarity inversion of the electrodes for very short cyclically reiterated periods, according to techniques known to those skilled in the art.

BRIEF DESCRIPTION OF THE DRAWINGS

The invention will be further described making use of the attached drawings, which are provided for a merely exemplary purpose.

DETAILED DESCRIPTION OF THE DRAWINGS

Figure 1:
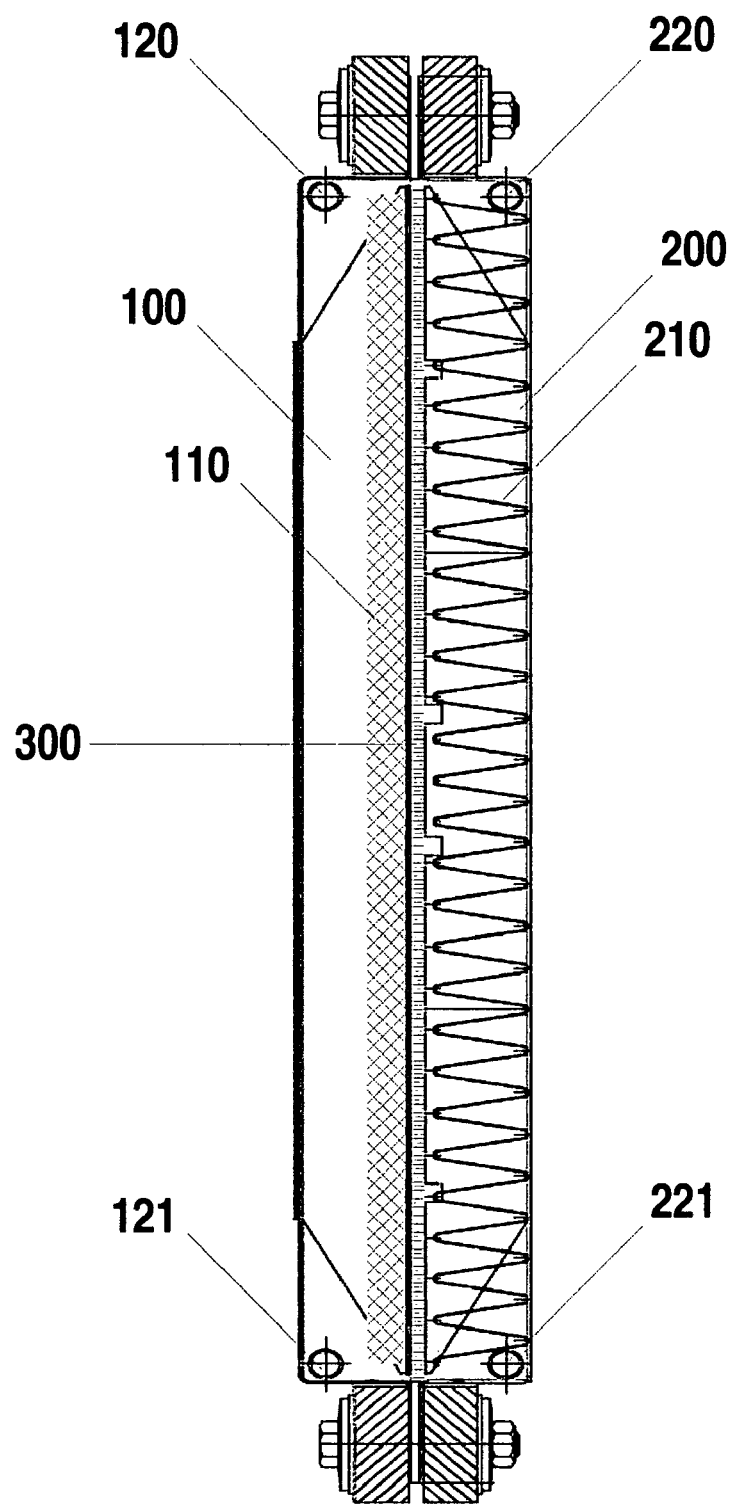
FIG. 1 represents a scheme of the reactor of the invention.

The reactor of the invention illustrated in FIG. 1 comprises a cathodic compartment (100) and an anodic compartment (200) separated by a semipermeable membrane (300), for instance an ion-exchange membrane. The cathodic compartment (100) comprises in its turn feed and discharge ducts (120, 121) for an electrolyte, preferably a sacrificial wine, and a cathode (110), for instance a steel or nickel mesh. The anodic compartment (200) comprises feed and discharge ducts (220, 221) for the wine to be treated, and an anode (210) consisting of a valve metal substrate, for instance of titanium, provided with a catalytic coating. Preferably, anode (210) has a surface provided with openings in order to favour the circulation of the liquid and has a corrugated geometry in order to maximise the contact surface with the bulk of wine to be treated: in the figure, there is shown an anode with an accordion geometry, but those skilled in the art will easily identify several types of corrugation with an equivalent technical effect. The reactor of the invention can also be equipped with electrical or redox potential probes for process control, not shown.

Figure 2:
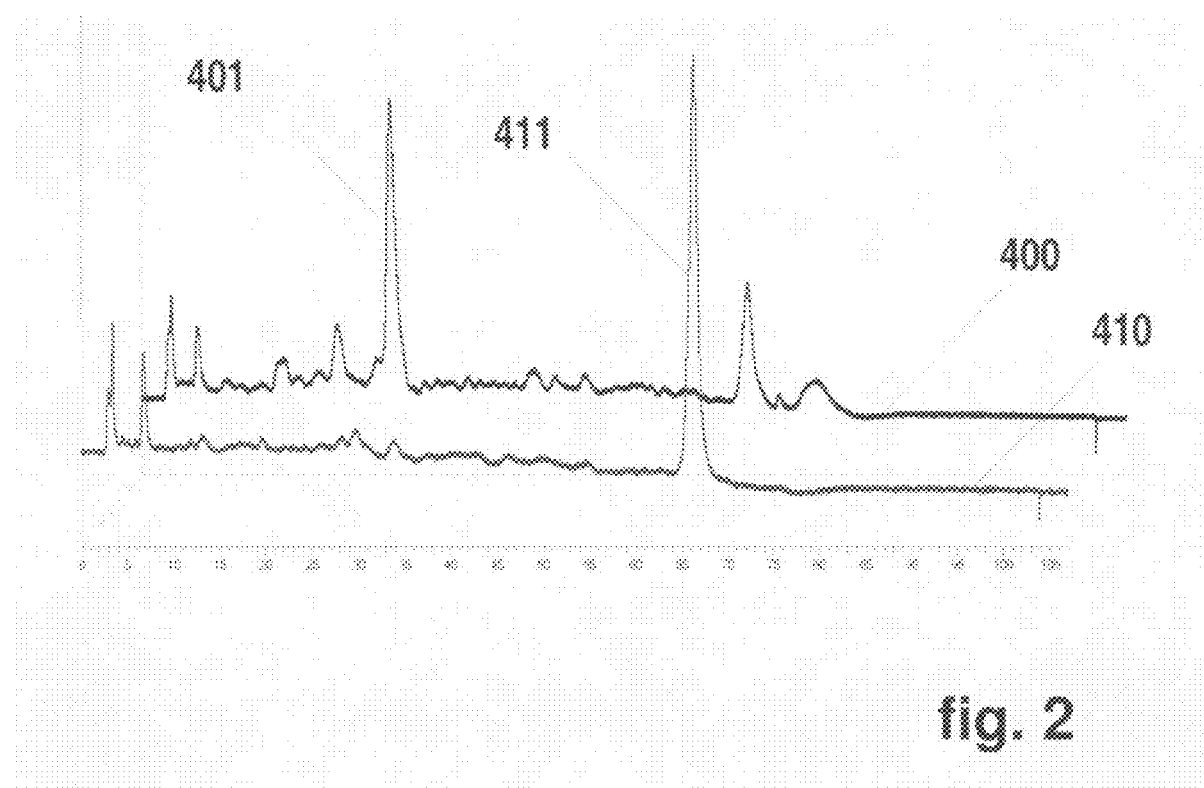
FIG. 2 represents HPLC chromatograms relative to a wine before and after the electrochemical process of the invention.

FIG. 2 shows two typical chromatographic spectra obtained by HPLC technique relative to a red wine before and after the maturation step. In curve (400), relative to a wine upon completion of the fermentation processes, peak (401) relative to free anthocyans is indicated; after the maturation step, curve (410) wherein such peak results absent is obtained, while in its place peak (411) relative to the correspondent addition and polymerisation products (polyphenolic pigments) appears. Such type of trend is very reproducible, in terms of peak positions, both in the case of natural and of electrochemical-type maturation processes.

EXAMPLE

A set of anodes in accordance with the invention were manufactured starting from a 0.5 mm thick titanium expanded sheet, corrugated according to an accordion geometry and activated with several types of catalytic coatings, obtained according to a prior art technique consisting of painting the titanium substrate with an activating solution of a noble metal precursor salt in multiple coats, carrying out an intermediate thermal decomposition step at 500° C. after each coat.

In particular, three different formulations were applied respectively containing platinum, ruthenium and iridium according to the following procedures:

sandblasting of the titanium expanded sheet with corundum and subsequent normalisation thermal treatment in air at 550° C. for two hours etching in 20% HCl for about 20 minutes at boiling temperature rinsing with deionised water and subsequent drying at 60° C.

manual painting in multiple cycles with precursor solution, with drying at 60° C. for 15 minutes and decomposition at 200° C. for 15 minutes after each cycle, until obtaining a loading of about 20 g/m$^2$ of noble metal final cooling in air The activating solutions were prepared as follows:

mixing of an aqueous solution of $H_2PtCl_6$, containing 50 g/l of Pt, with 2-propanol until obtaining a 1:1 weight ratio of water to 2-propanol (platinum precursor).

mixing of an aqueous solution of $RuCl_3$ (20% by weight Ru, with 5M acidity by addition of HCl) with an aqueous solution of $TiCl_3$ (51.8 g/l of Ti, acidified with HCl) until obtaining a 55:45 weight ratio of Ti to Ru; addition of 2-propanol until obtaining a 1:10 weight ratio to water (ruthenium precursor).

mixing of an aqueous solution of $H_2IrCl_6$, containing 100 g/l of Ir, with 1M acidity by addition of HCl, with a solution of $TaCl_5$ in concentrated HCl, 50 g/l of Ta (iridium precursor).

Titanium applied with the ruthenium precursor as well as tantalum applied with the iridium precursor have no particular catalytic activity but serve to impart stability to the coating, as known to those skilled in the art.

Each of the thus-obtained anodes, having a 1000 cm² superficial area, was characterised in a reactor according to the illustration in FIG. 1 with an anodic 3 liter compartment. The reactor was fed at the anodic compartment with a red wine proceeding from the fermentation step and at the cathodic compartment with an electrolyte consisting of a sacrificial wine, which serves to maintain an osmotic equilibrium across the semipermeable separator. The characterisation tests were carried out at two distinct current densities, respectively 0.6 and 1.8 $\mu A/cm^2$ for a few days, controlling the potential below 1 V. The process was also monitored through redox potential probes. After each treatment, organoleptic tests were performed according to codified norms, then a subsequent electrochemical treatment was carried out increasing the current so as to overcome the oxygen evolution potential, for the duration of one day. After this second treatment, a 15 day bottling was effected, subsequently repeating the organoleptic tests.

Figure 3:
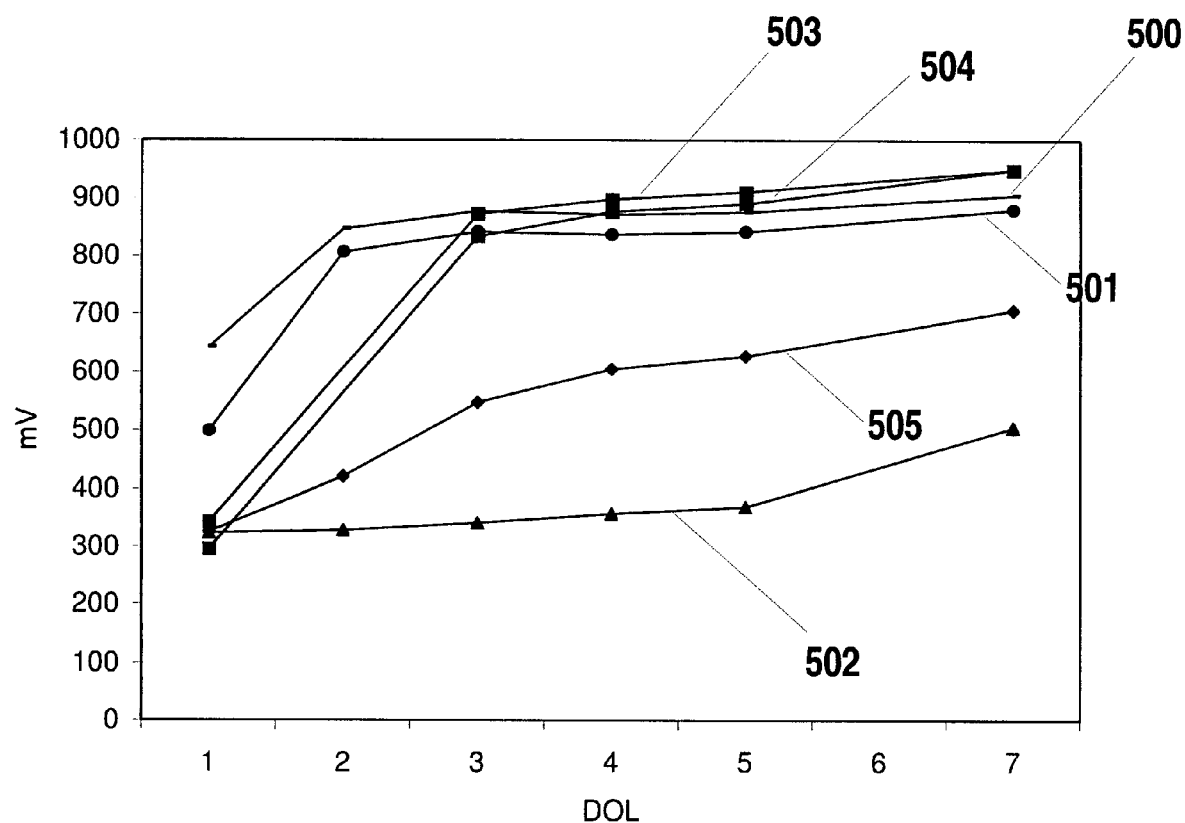
FIG. 3 shows the trend of electrical potentials of different anodes during the electrochemical process of the invention carried out with different operative parameters.

FIG. 3 shows the trend of potential recorded in the course of the first part of the characterisation; in particular, in abscissa are reported the days on line (DOL) and in ordinate the potentials relative to 0.6 $\mu A/cm^2$ micro-currents with iridium (500), ruthenium (501), platinum (502) coating and 1.8 $\mu A/cm^2$ micro-currents with iridium (503), ruthenium (504), platinum (505) coating.

In each case the potential could be maintained below 1 V without too many difficulties, even though a time increase was observed, presumably due to electrode surface fouling. By repeating some of these tests in similar conditions but with pulsed current, for instance by supplying anodic current for 10 second periods separated by 1 second of current supply at reversed potential, a much more constant potential trend was observed.

Figure 4:
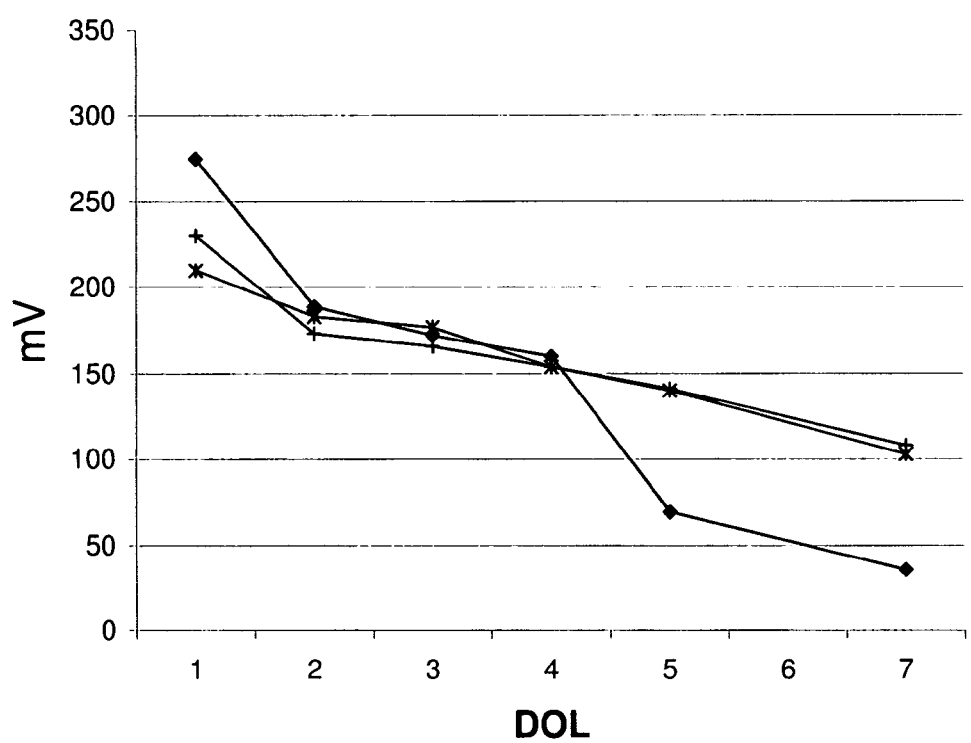
FIG. 4 shows the trend of redox potentials measured by means of suitable probes in correspondence of the electrochemical treatments characterised in FIG. 3

During the supply of micro-current, it was also recorded the redox potential trend, which offers a valuable means for the automated process control. In FIG. 4 there are shown as (600) the redox potential trend during the maturation on iridium-based catalytic coating corresponding to potential curve (503) in FIG. 3; as (601) the redox potential trend during the maturation on ruthenium-based catalytic coating corresponding to potential curve (504) in FIG. 3; as (602) the redox potential trend during the maturation on platinum-based catalytic coating corresponding to potential curve (505) in FIG. 3.

As it can be noticed, the platinum catalyst, besides allowing an easier electrical potential control with respect to those of iridium and ruthenium; also determines a completion of the maturation processes in shorter times.

Figure 5:
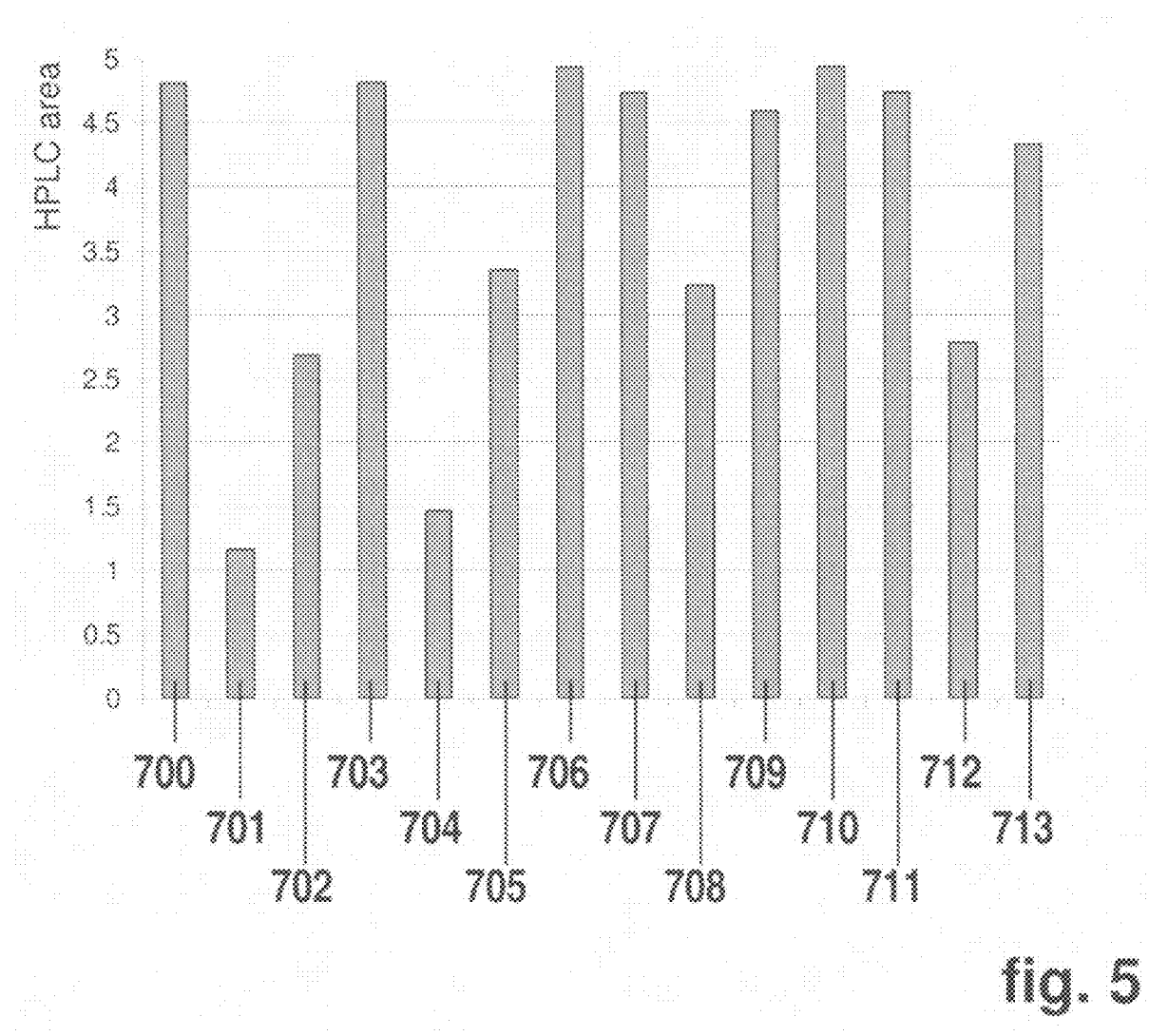
FIG. 5 shows the percentage increment of phenolic compound polymerisation products during the electrochemical process of the invention with the anodes characterised in FIGS. 3 and 4.

The organoleptic tests after this series of electrochemical treatments evidenced a maturation substantially comparable to what obtainable in times of about three months by means of a natural maturation, and with a stabilisation of purple hues and of fresh and fruity scented components not obtainable by the electrochemical maturation processes of the prior art. The decrease in the concentration of free anthocyans following this step was confirmed by HPLC chromatography determinations, as shown in FIG. 5 which reports in a bar diagram the areas corresponding to the anthocyan peak indicated as (401) in FIG. 2 for the various tests. Bars Indicated with (700), (703), (706), (707), (710) and (711) are referred to determinations on samples before treatment; (701) and (704) to two different tests on previous samples (700) and (703), with platinum-based catalytic activation and with a 1.8 $\mu A/cm^2$ current; (702) and (705) to tests on previous samples (700) and (703), with platinum-based catalytic activation, after the passage of a 0.6 $\mu A/cm^2$ current; (708) and (709) respectively to two different tests on previous samples (706) and (707), with ruthenium-based catalytic activation and with current of 1.8 and 0.6 $\mu A/cm^2$ respectively; (712) and (713) respectively to two different tests on previous samples (710) and (711), with iridium-based catalytic activation and with current of 1.8 and 0.6 $\mu A/cm^2$ respectively.

Also the chromatographic determination reported in FIG. 5 confirms that the platinum-based catalytic activation is the one providing the best results in terms of anthocyan conversion.

The samples coming from the first step of electrochemical maturation according to the invention, at potential controlled below 1 V, were subsequently subjected to a 24 hour treatment at slightly higher current, in order to overcome the oxygen discharge potential.

Upon completion of this step, all of the treated samples showed a significant variation in colour, evolved from ruby/purple toward orange/brick. All samples were then bottled and the organoleptic tests were repeated after fifteen days, evidencing marmalade and cooked fruit components typical of aged wines. The wine subjected to treatment on platinum electrodes presented characteristics practically equivalent to those of a wine subjected to evolution by natural procedures, involving remarkably lengthier times with respect to the process of the invention.

The previous description is not intended to limit the invention, which may be used according to different embodiments without departing from the scopes thereof, and whose extent is univocally defined by the appended claims.

The invention claimed is;

1. Process of controlled evolution of wine at the anodic compartment of an electrochemical cell comprising at least one step of electrical micro-current application at an electrical potential lower than 1 V vs. Ag/AgCl through a cathode and an anode separated by a semipermeable membrane, said anode comprising a valve metal substrate provided with catalytic coating containing at least one noble metal or oxide thereof.

2. The process of claim 1 wherein said at least one step of electrical micro-current application at an electrical potential lower than 1 V vs. Ag/AgCl is carried out at a current density comprised between 0.1 and 50 $\mu A/cm^2$.

3. The process of claim 1 or 2 wherein during said step of electrical micro-current application at an electrical potential lower than 1 V vs. Ag/AgCl, the polymerisation or association of phenolic compounds contained in the treated wine takes place.

4. The process of any one of the previous claims further comprising at least one additional step of electrical micro-current application with evolution of oxygen.

5. The process of any one of the previous claims wherein said noble metal is platinum.

6. The process of any one of the previous claims wherein said valve metal is titanium.

7. The process of any one of the previous claims wherein at least one of said steps of electrical micro-current application is carried out at a pulsed current regime.

8. The process of any one of the previous claims wherein the evolution of wine is controlled through a redox potential measurement.

* * * * *